US008828496B2

(12) United States Patent
Kurata et al.

(10) Patent No.: US 8,828,496 B2
(45) Date of Patent: Sep. 9, 2014

(54) COATING METHOD

(75) Inventors: Tatsuki Kurata, Sagamihara (JP); Hiroyuki Mitomo, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 707 days.

(21) Appl. No.: 13/060,912

(22) PCT Filed: Jul. 28, 2009

(86) PCT No.: PCT/JP2009/003548

§ 371 (c)(1), (2), (4) Date: Feb. 25, 2011

(87) PCT Pub. No.: WO2010/023814

PCT Pub. Date: Mar. 4, 2010

(65) Prior Publication Data

US 2011/0159197 A1 Jun. 30, 2011

(30) Foreign Application Priority Data

Aug. 28, 2008 (JP) ................................ 2008-220297
Apr. 27, 2009 (JP) ................................ 2009-107961

(51) Int. Cl.

| | |
|---|---|
| ***B05D 1/02*** | (2006.01) |
| ***B05D 5/00*** | (2006.01) |
| ***B05D 7/00*** | (2006.01) |
| ***B28B 19/00*** | (2006.01) |
| ***B29B 15/10*** | (2006.01) |
| ***C23C 18/00*** | (2006.01) |
| ***C23C 20/00*** | (2006.01) |
| ***C23C 28/00*** | (2006.01) |
| ***B05D 5/06*** | (2006.01) |
| ***B05B 3/10*** | (2006.01) |
| *B05D 3/04* | (2006.01) |
| *B05B 13/04* | (2006.01) |

(52) U.S. Cl.

CPC .............. *B05B 3/1092* (2013.01); *B05D 5/067* (2013.01); *B05D 3/042* (2013.01); *B05B 13/0431* (2013.01)

USPC ...................... 427/427.2; 427/421.1; 118/300

(58) Field of Classification Search

None

See application file for complete search history.

(56) References Cited

U.S. PATENT DOCUMENTS 2,993,468 A * 7/1961 Zmuda et al. ................ 118/300
6,189,804 B1 * 2/2001 Vetter et al. ...................... 239/7

(Continued)

FOREIGN PATENT DOCUMENTS

CN 2038814 U 6/1989
CN 1539557 A 10/2004

(Continued)

OTHER PUBLICATIONS

RB1000 series, [on line], ABB, <URL:http://www.abb.co.jp/product/seitp327/5469b0422ebd2725c1257466003ac207.aspx?productLanguage=jp&country=jp>.

(Continued)

*Primary Examiner* — Timothy Meeks
*Assistant Examiner* — Michael P Rodriguez
(74) *Attorney, Agent, or Firm* — Foley & Lardner LLP

(57) ABSTRACT

A coating method of coating a surface of an object with a paint containing a glitter pigment, including: spraying the paint onto the surface of the object; and controlling a color shade of the paint on the object by adjusting a particle size of paint particles to be sprayed according to a spray width indicating a width of a spread of the paint particles.

6 Claims, 8 Drawing Sheets

(56) References Cited

U.S. PATENT DOCUMENTS

| | | | | |
|---|---|---|---|---|
| 2004/0144860 | A1 * | 7/2004 | Nolte et al. | 239/290 |
| 2007/0034715 | A1 * | 2/2007 | Clifford et al. | 239/291 |
| 2008/0121740 | A1 | 5/2008 | Yamada | |
| 2008/0271668 | A1 | 11/2008 | Hasegawa et al. | |
| 2009/0026293 | A1 | 1/2009 | Yamada et al. | |
| 2009/0032625 | A1 | 2/2009 | Yamada | |
| 2010/0193613 | A1 | 8/2010 | Yamada | |

FOREIGN PATENT DOCUMENTS

| | | | |
|---|---|---|---|
| CN | 1913978 | A | 2/2007 |
| CN | 101132862 | A | 2/2008 |
| GB | 2 294 214 | A | 4/1996 |
| JP | 2006-263684 | A | 10/2006 |
| JP | 2007-260490 | A | 10/2007 |
| JP | 2007-260491 | A | 10/2007 |
| WO | WO 2006103964 | A1 * | 10/2006 |

OTHER PUBLICATIONS

Japanese Office Action and English language translation, dated Nov. 12, 2013, (7 pgs.).

* cited by examiner (A)

(B)

(C)

(A)

(B)

COATING METHOD

TECHNICAL FIELD

The present invention relates to a coating method of coating a surface of an object with paint containing a glitter pigment by spraying the paint onto the surface.

BACKGROUND ART

In the general automobile coating process such as the surfacer process and the topcoat process, for the purpose of mass production, a body of an automobile is loaded on a trolley and is conveyed by a conveyer to undergo automatic coating by a robot and a reciprocating coating apparatus.

In the automatic coating in recent years, a rotary atomizer with a bell cup has been often used instead of an air spray gun. Lately, in particular, there has been developed a rotary atomizer having a coating performance improved as compared to a conventional one in such a manner that paint is discharged at a higher discharge rate and is then atomized in a bell cup which is put in very high speed rotation (see Non-patent Literature 1). The use of such a rotary atomizer enables the coating to be performed by a coating apparatus having a smaller number of rotary atomizers than that in a conventional coating apparatus. Moreover, this rotary atomizer can change its spray pattern size, indicating the spread of paint particles to be sprayed, during a coating operation for example. Thus, over-spray, in which some amount of paint is sprayed outside the edge of the object to be coated and wasted, may be prevented, thereby reducing the loss of paint.

CITATION LIST

Non Patent Literature

[NPL 1] RB1000 series, [online], ABB Ltd., located on the Internet on Aug. 6, 2008, at http://www.abb.co.jp/product/seitp327/5469b0422ebd2725c1257466003ac207.aspx?productLanguage=jp&country=JP.

SUMMARY OF INVENTION

When coating is performed with the above rotary atomizer while the spray pattern size (hereinafter also referred to as "spray width") of paint particles to be sprayed on a surface of the object to be coated is changed, the flying velocity of the paint particles in a direction perpendicular to the surface of the object to be coated changes according to the changed spray pattern size. The higher the flying velocity of the paint particles and the higher the impact velocity of the paint particles toward the surface of the object to be coated, the more the glitter pigment contained in the paint is likely to be oriented in parallel with the surface of the object to be coated. Thereby, metallic effect of a coating film is increased.

In other words, when the spray pattern size is changed, there occurs a change in an amount of impact energy with which each of paint particles collides with the surface of the object to be coated. For this reason, the orientation of the glitter pigment contained in the paint changes, thus causing an uneven color development. This results in a problem with appearance quality where a desired color shade cannot be obtained.

Meanwhile, in performing the coating, when the change in the flying velocity of the paint particles is suppressed, that is, when the spray pattern size is less changed (the spray pattern size is changed within a limited narrow range) in order to ensure the appearance quality, an amount of overspray increases.

Further, in employing a new paint color, a new coating condition for obtaining a desired color shade needs to be studied for every spray pattern, since a method of controlling color development for various spray patterns is not defined. This brings about a problem with lead-time where a large amount of time for this study is required until a new paint color is employed.

The present invention has been made to solve the foregoing problems. It is therefore an object of the present invention to provide a coating method capable of obtaining a desired color shade for various spray widths, thereby of reducing the loss of paint, and of promptly determining a new coating condition for obtaining the desired color shade.

An aspect of the present invention is a coating method of coating a surface of an object with a paint containing a glitter pigment, the coating method comprising: spraying the paint onto the surface of the object; and controlling a color shade of the paint on the object by adjusting a particle size of paint particles to be sprayed according to a spray width indicating a width of a spread of the paint particles.

DESCRIPTION OF EMBODIMENT

An embodiment of the present invention will be described in detail below with reference to the drawings.

Figure 1:
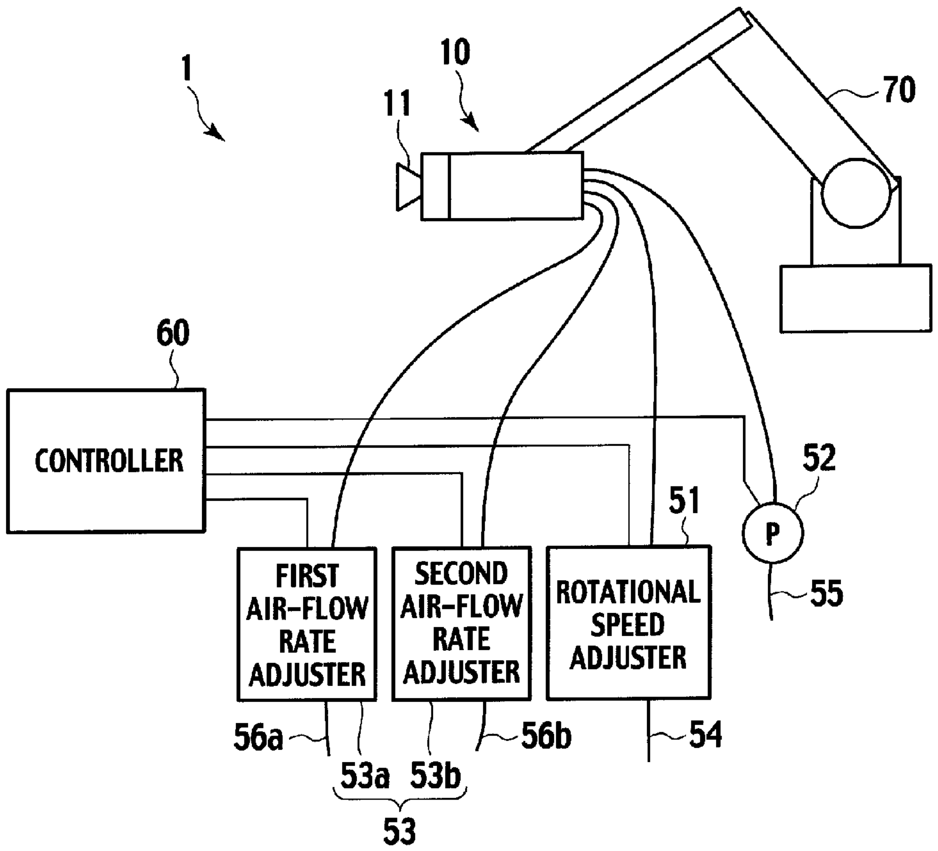
FIG. 1 is an overall structural view showing an outline of a coating apparatus according to an embodiment of the present invention.
Figure 2:
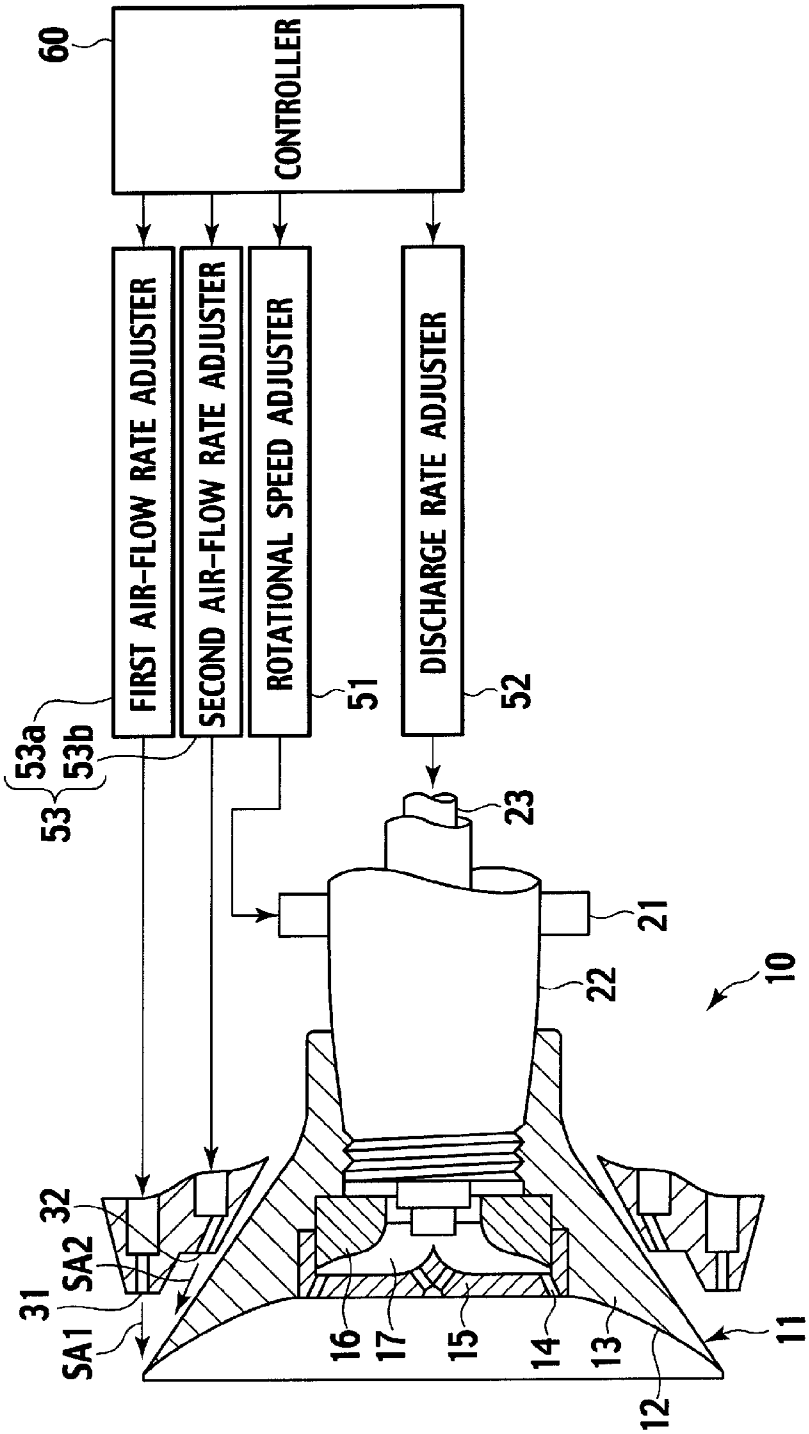
FIG. 2 is a view showing a rotary atomizer shown in FIG. 1 and its control structure.

FIG. 1 is an overall structural view showing an outline of a coating apparatus according to the embodiment of the present invention. FIG. 2 is a view showing a rotary atomizer shown in FIG. 1 and its control structure.

A coating apparatus 1 of this embodiment coats a surface of an object to be coated, such as a body of an automobile, with paint containing a glitter pigment by spraying the paint on the surface.

As shown in FIG. 1, the coating apparatus 1 includes: a rotary atomizer 10 having a bell cup 11; a rotational speed adjuster 51 which adjusts the rotational speed of the bell cup 11; a discharge rate adjuster 52 which adjusts the discharge rate of paint; airflow rate adjusters 53 which adjust the airflow rate of shaping air to be blown from the rear side of the bell cup 11; and a controller 60 which adjusts the color shade of paint to be applied on the object by controlling these adjusters 51, 52 and 53.

The airflow rate adjuster 53 is formed of: a first airflow rate adjuster 53*a* which adjusts the airflow rate of first shaping air; and a second airflow rate adjuster 53*b* which adjusts the airflow rate of second shaping air. From the rear side of the bell cup 11, the first shaping air is blown toward the object to be coated (in a direction substantially parallel to the rotational axis of the bell cup 11, for example), whereas the second shaping air is blown toward the object to be coated at an angle extending outwardly from the traveling direction of the first shaping air (in a radially outwardly extending direction toward the object to be coated, crossing at an angle with the direction substantially parallel to the rotational axis of the bell cup 11, for example).

The rotational speed adjuster 51 is specifically an airflow rate adjusting valve installed in an air supply tube 54 connected between the rotary atomizer 10 and an air supply source not shown. The discharge rate adjuster 52 is specifically a pump installed in a paint supply tube 55 connected between the rotary atomizer 10 and a paint supply source not shown. The airflow rate adjusters 53 are specifically airflow rate adjusting valves respectively installed in air supply tubes 56*a* and 56*b* each connected between the rotary atomizer 10 and the air supply source not shown.

The rotary atomizer 10 is attached to the leading end of an arm of a robot 70 which moves the rotary atomizer 10 to a position facing a surface of the object to be coated. The robot 70 is, for example, a 6-axis coating robot capable of wide-area operation.

As shown in FIG. 2, the bell cup 11 of the rotary atomizer 10 is a cup-shaped atomizing head which rotates around its rotational axis. The bell cup 11 includes: a bell main body 13 in which a paint spreading surface 12 is formed; a hub portion 15 which is disposed at the bottom of the paint spreading surface 12 of the bell main body 13, and has multiple paint supply holes 14 for supplying paint onto the paint spreading surface 12; and a top member 16 which is disposed behind the hub portion 15, that is, opposite to the paint spreading surface 12. A space is formed between the hub portion 15 and the top member 16. The space constitutes a paint distributing chamber 17 which collects paint colliding with the back surface of the hub portion 15 and stably introduces the collected paint to the multiple paint supply holes 14.

A hollow shaft 22 which is rotated by driving means such as an air motor 21 is attached rearward of the bell cup 11. A taper shaft portion is formed on the leading end side of the hollow shaft 22, and is inserted and fitted into a taper hole of the bell main body 13. Further, a male screw portion is formed on the leading end side of the taper shaft portion, and is screwed into a female screw portion of the bell main body 13. A paint supply duct 23 for delivering paint to the paint distributing chamber 17 is installed at the center inside the hollow shaft 22.

The paint spreading surface 12 of the bell main body 13 has a cup shape or a plate shape. The paint spreading surface 12 generally is an approximately conical surface widening toward the object to be coated, and is a surface having a straight or concave-curved profile line in a cross section cut along a plane containing the rotational axis. Multiple grooves not shown which are cut in approximately the rotational-axis direction are formed in the outer fringe portion of the paint spreading surface 12 of the bell main body 13, and are designed to spurt paint from the outer fringe portion in a thread-like manner.

The rotary atomizer 10 includes a first air outlet 31 and a second air outlet 32. The first air outlet 31 blows air from the rear side of the bell cup 11 toward the object to be coated (in a direction substantially parallel to the rotational axis of the bell cup 11, for example). On the other hand, the second air outlet 32 blows air from the rear side of the bell cup 11 at an angle extending outwardly, relative to the object to be coated, from the traveling direction of the air blown from the first air outlet 31 (in a radially outwardly extending direction toward the object to be coated, crossing at an angle with the direction substantially parallel to the rotational axis of the bell cup 11, for example). Here, each of the air outlets 31 and 32 may be formed of multiple holes, or may be formed of a ring-shaped slit. First and second shaping air SA1 and SA2 described above blow from the first and second air outlets 31 and 32, respectively. Paint particles are urged to fly toward the object to be coated by the shaping air.

A spray pattern size indicating the spread of sprayed paint particles is changed by the change of the ratio between the airflow rates of the first and second shaping air SA1 and SA2 shown in FIG. 2. In this embodiment, the first shaping air SA1 functions to reduce (narrow) the spray pattern by increasing its airflow rate. Meanwhile, the second shaping air SA2 functions to increase (widen) the spray pattern by increasing its airflow rate. Here, the spray pattern size, that is, a spray width indicates a width over which sprayed paint particles are spread.

Note that, the structure of the rotary atomizer 10 described above is merely an example, and rotary atomizers 10 of various structures may be employed.

Paint used in this embodiment contains glitter pigment such as aluminum flakes, and thus provides a metallic effect (glittering effect) to the appearance of the surface of the object when being applied thereto. The metallic effect is objectively evaluated by the measurement of the intensity value (IV) using a commercially-available metallic effect measuring device (manufactured by Kansai Paint Co. Ltd.). Specifically, when a very progressive laser beam from a laser source is incident on a coated surface, the incident light beam undergoes repeated multiple reflection on the surface of the glitter pigment in a metallic coating film, resulting in a light beam reflected in accordance with the orientation of the glitter pigment. The IV represents the ratio between the incident light beam and the reflected light beam. It is also possible to evaluate the metallic effect by using the flop index (FI) value being the index of metallic effect for a spectrophotometer such as the X-Rite MA68II.

Figure 3:
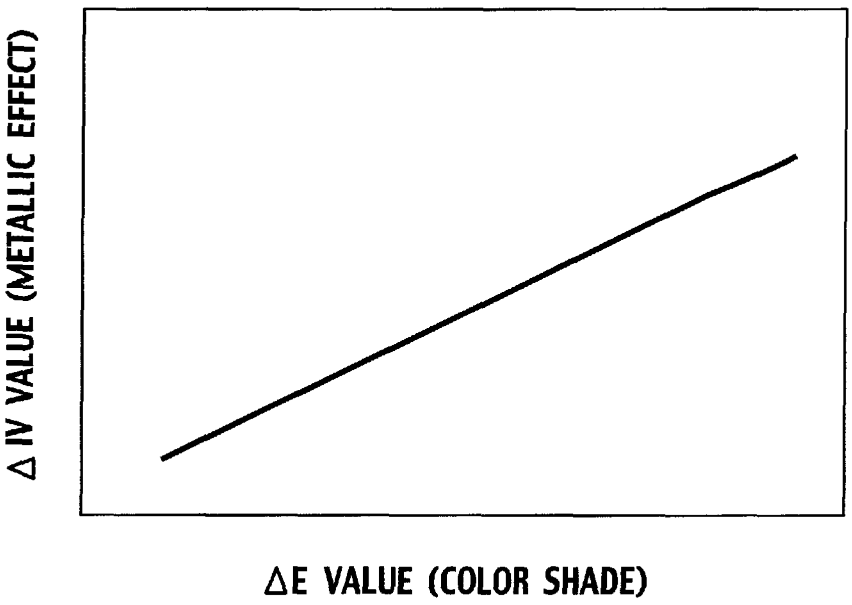
FIG. 3 is a graph showing a relation between a color shade and metallic effect.

FIG. 3 is a graph showing the relation between a color shade and metallic effect. FIG. 3 shows that the color shade is strongly related to the IV representing the metallic effect. Note that, in the terms of automobile coating, a color shade denotes a color difference relative to the coating standard color. In the actual manufacturing line, the line is managed in such a way that a uniform standard plate having standard color is created, and that a difference between the color of a target car and its corresponding standard color in the standard plate is defined as a color shade.

The controller 60 controls the color shade of paint to be developed on the object to be coated by adjusting the particle size of paint particles in accordance with the spray width.

Specifically, the controller 60 controls the color shade of paint to be developed on the object to be coated by adjusting the particle size and flying velocity of paint particles on the basis of the following relations: the relation between the particle size of the paint particles and the metallic effect of a coating film, in which a smaller particle size of the paint particles brings higher metallic effect of the coating film whereas a larger particle size of the paint particles brings lower metallic effect of the coating film; the relation between the flying velocity of the paint particles in a direction perpendicular to the surface of the object to be coated and the metallic effect of the coating film, in which a higher flying velocity of the paint particles brings higher metallic effect of the coating film whereas a lower flying velocity of the paint particles brings lower metallic effect of the coating film.

In this embodiment, the controller 60 controls the color shade of paint to be developed on the object to be coated by setting the particle size of the paint particles to be sprayed on a first portion of the object to be coated at a predetermined value smaller than that for the particle size of paint particles to be sprayed on a second portion of the object to be coated. Here, the spray width for the first portion is set larger than for the second portion. The controller 60 sets the particle size of the paint particles to be sprayed on the first portion of the object to be coated at the predetermined value smaller than that for the second portion of the object to be coated so that the color shade of paint applied on the first portion may be the same as the color shade of paint applied on the second portion. Thereby, the controller 60 can perform coating while controlling the color shade of paint to be uniform over the entire object to be coated.

Hereinafter, a description will be given of the relation in which a smaller particle size of the paint particles brings higher metallic effect of a coating film and the relation in which a higher flying velocity of the paint particles in a direction perpendicular to the surface of the object to be coated brings higher metallic effect of the coating film.

Figure 4:
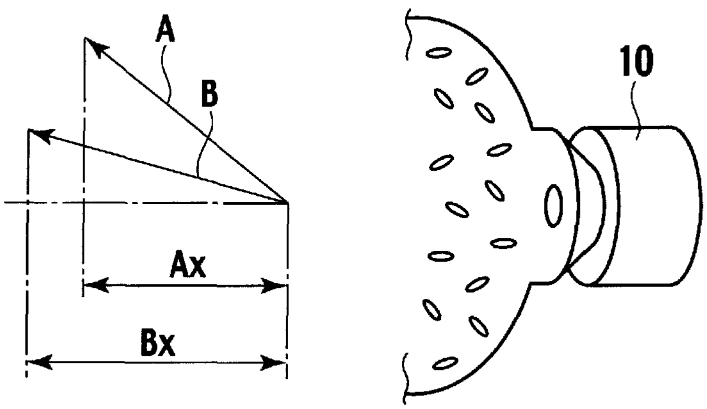
FIG. 4 is a view for illustrating a state in which a flying velocity of paint particles in a direction perpendicular to a surface of an object to be coated changes according to a spray pattern size.

FIG. 4 is a view for illustrating a state in which the flying velocity of paint particles in a direction perpendicular to the surface of the object to be coated changes according to the spray pattern size. FIG. 4 shows that a flying velocity Ax of paint particles in a direction perpendicular to the surface of the object to be coated with a wide spray pattern (flying velocity vector A) is lower than a flying velocity Bx of the paint particles in the direction perpendicular to the surface of the object to be coated with a narrow spray pattern (flying velocity vector B).

Figure 5:
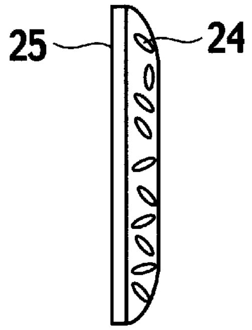
FIG. 5 is a view for illustrating a relation between the flying velocity of paint particles in a direction perpendicular to the surface of the object to be coated and the metallic effect.
Figure 5:
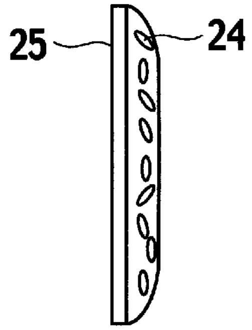
Figure 5:
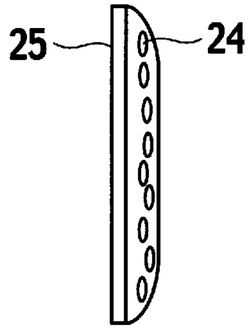

FIG. 5 is a view for illustrating the relation between the flying velocity of paint particles in a direction perpendicular to the surface of the object to be coated and the metallic effect. FIG. 5(A) to FIG. 5(C) are cross-sectional views schematically showing the state in which the glitter pigment is oriented when the flying velocity is low, the state in which the glitter pigment is oriented when the flying velocity is intermediate, and the state in which the glitter pigment is oriented when the flying velocity is high, respectively. As shown in FIG. 5, the higher the flying velocity of paint particles in a direction perpendicular to the surface of an object to be coated 25 is, the higher the impact velocity of the paint particles against the surface of the object to be coated 25 becomes. Thus, the higher flying velocity allows a glitter pigment 24 contained in the paint to be more likely to be oriented in parallel with the surface of the object to be coated 25, resulting in higher metallic effect of a coating film.

In summary, FIGS. 4 and 5 show that a narrower spray pattern brings a higher flying velocity of paint particles in a direction perpendicular to the surface of the object to be coated 25, that the higher flying velocity allows the glitter pigment 24 to be more likely to be oriented in parallel with the surface of the object to be coated 25, and that this orientation brings higher metallic effect of a coating film on the surface of the object to be coated 25. These drawings also show that a wider spray pattern brings a lower flying velocity of the paint particles in the direction perpendicular to the surface of the object to be coated 25, that the lower flying velocity causes the glitter pigment 24 to be less likely to be oriented in parallel with the surface of the object to be coated 25, and that this orientation brings lower metallic effect of the coating film.

Further, it was found out by experiment that a smaller particle size of the paint particles brought higher metallic effect of a coating film. This is considered to be due to the following reason: the smaller the particle size of the paint particles, the more the paint particles are stretched and flattened along the surface of the object to be coated 25; thus, this allows the glitter pigment 24 to be more likely to be oriented in parallel with the surface of the object to be coated 25.

Figure 6:
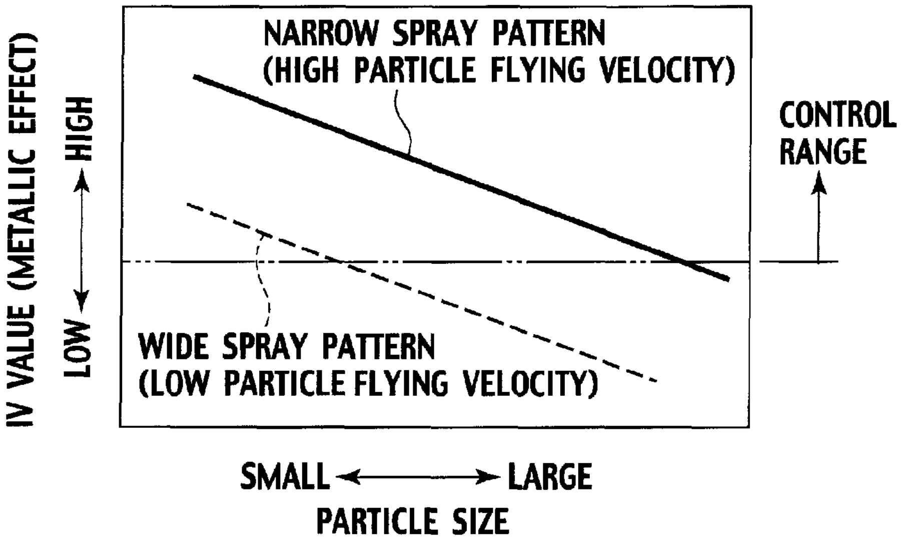
FIG. 6 is a graph, obtained by experiment, showing an influence, on the metallic effect, of a particle size of paint particles and the flying velocity of the paint particles in a direction perpendicular to the surface of the object to be coated.

FIG. 6 is a graph, obtained by experiment, showing the influence, on the metallic effect of a coating film, of the particle size of the paint particles and the flying velocity of the paint particles in a direction perpendicular to the surface of the object to be coated. FIG. 6 shows that a smaller particle size of the paint particles brings higher metallic effect of the coating film, and that a higher flying velocity of the paint particles in the direction perpendicular to the surface of the object to be coated brings higher metallic effect of the coating film.

For example, the following regression formula was obtained in the experiment using silver (aluminum only for a glitter pigment) as a paint color:

$$IV=187.64-1.13\times\text{particle size}+10.54\times\text{particle flying velocity} \quad \text{[Math. 1]}$$

where the unit for the particle size is micrometer, and the unit for the particle flying velocity is meter per second (m/s).

Generally, a glitter pigment whose IV is not less than a predetermined recommended value is regarded as having a good orientation state, and thus as exhibiting its intrinsic metallic effect. For this reason, as shown in FIG. 6, a range in which IV is not less than the predetermined recommended value is regarded as a range within which the controller 60 performs the control.

Figure 7:
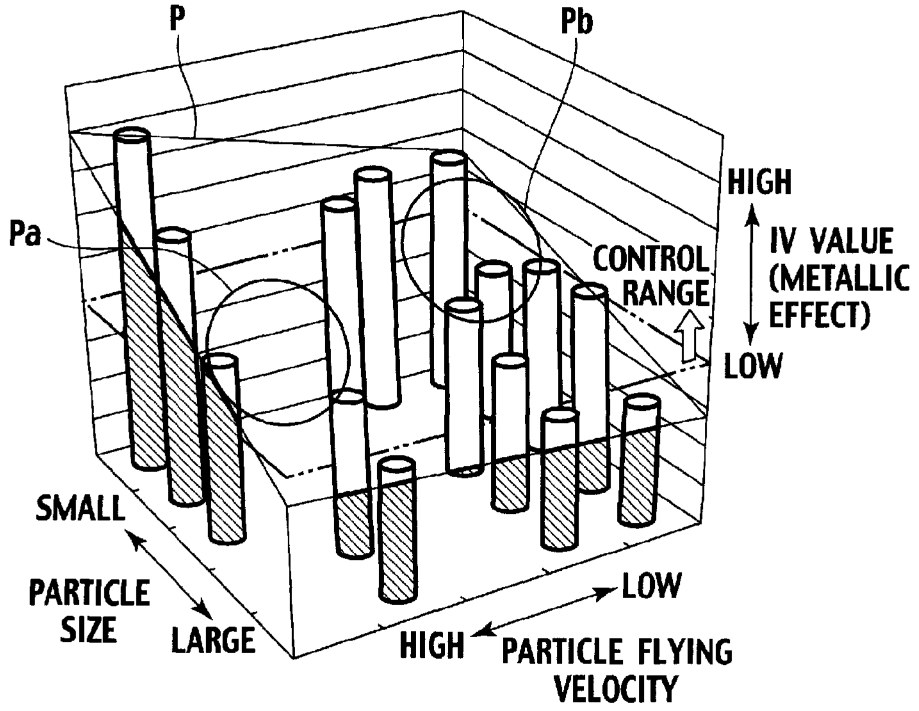
FIG. 7 is a graph in which the graph of FIG. 6 is three-dimensionally shown.

FIG. 7 is a graph in which the graph of FIG. 6 is three-dimensionally shown. As shown in FIG. 7, the relation among the particle size, the particle flying velocity and the IV (metallic effect) is represented by a plane P. In FIG. 7, the control range is located upside of a plane represented by a chain double-dashed line. A region Pa on the plain P of FIG. 7 shows a case of employing a coating method in which particles of relatively large size collide with the object to be coated at a relatively high velocity, whereas a region Pb shows a case of employing a coating method in which particles of relatively small size collide with the object to be coated at a relatively low velocity.

Accordingly, when performing coating while changing the spray pattern size, that is, while changing the flying velocity of paint particles, the controller 60 controls the particle size of the paint particles while regarding the particle size as an intermediary factor in the association between the flying velocity and the IV (metallic effect). Thereby, the controller 60 can make the IVs at different spray pattern sizes coincide with each other, and thus can control the color shade of paint.

In other words, the controller 60 can control the color shade of paint regardless of the spray pattern size.

Subsequently, a description will be given of a fact that the particle size and flying velocity of paint particles can be controlled by the control of the discharge rate of paint, the rotational speed of a bell cup, and the airflow rate of shaping air, which are concrete coating conditions.

Figure 8:
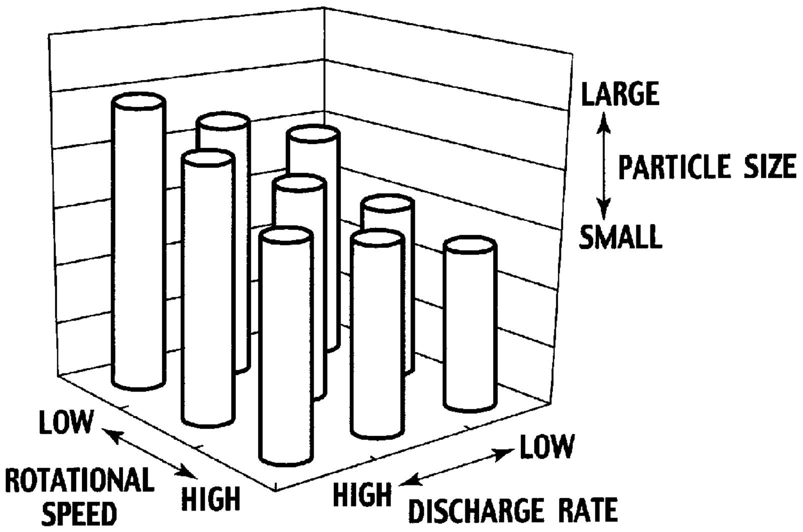
FIG. 8 is a graph, obtained by experiment, showing an influence, on the particle size of paint particles, of a discharge rate of paint and a rotational speed of a bell cup.

FIG. 8 is a graph, obtained by experiment, showing the influence, on the particle size of paint particles, of the discharge rate of paint and the rotational speed of a bell cup. FIG. 8 shows that a higher discharge rate brings a larger particle size, and that a higher rotational speed of the bell cup brings a smaller particle size. Thus, the controller 60 can adjust the particle size of paint particles by adjusting the rotational speed of the bell cup 11 and/or the discharge rate of paint of the rotary atomizer 10.

Figure 9:
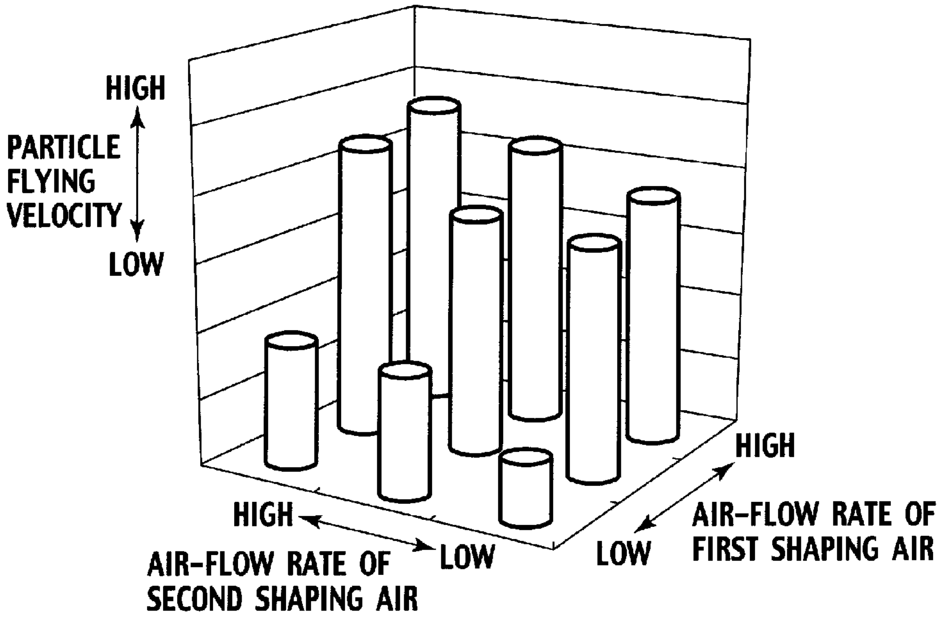
FIG. 9 is a graph, obtained by experiment, showing an influence, on the flying velocity of paint particles, of airflow rates of first and second shaping air.

FIG. 9 is a graph, obtained by experiment, showing the influence, on the flying velocity of paint particles, of the airflow rates of the first and second shaping air. FIG. 9 shows that higher discharge rates of the shaping air bring a higher flying velocity. Thus, the controller 60 can adjust the flying velocity of a paint particle by adjusting the airflow rates of the shaping air. Here, the spray pattern size can be easily changed by the change of the ratio between the airflow rates of the first and second shaping air, as described above.

Next, a description will be given of the operation of this embodiment configured as described above.

The coating condition in consideration of transfer efficiency is set in the following manner. First, a required amount of coating per unit time is set in accordance with the types of coating to be performed.

Then, in terms of the transfer efficiency, the spray pattern size (which includes two kinds of size, wide and narrow, for example, and may include three kinds or more) is set so that overspray may be prevented in which some amount of paint is sprayed outside the edge of the object to be coated and wasted.

Figure 10:
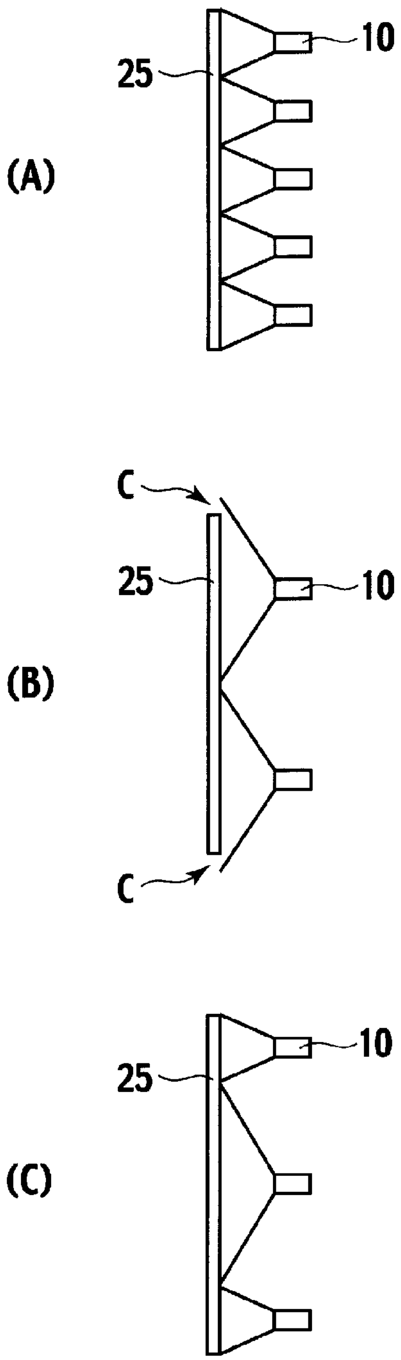
FIG. 10 is a view for illustrating an occurrence of overspray.

FIG. 10 is a view for illustrating the occurrence of overspray. When the rotary atomizer 10 performs coating on the object to be coated 25 with a narrow spray pattern as shown in FIG. 10(A), overspray seldom occurs. By contrast, when the rotary atomizer 10 performs coating on the object to be coated 25 with a wide spray pattern as shown in FIG. 10(B), overspray occurs to a considerable extent at portions C lateral to edges of the object to be coated 25. To deal with this problem, in this embodiment, the setting is performed such that the rotary atomizer 10 may perform coating on the object to be coated 25 with two kinds of wide and narrow spray patterns, for example, as shown in FIG. 10(C). This makes it possible to prevent the occurrence of overspray and thereby to reduce the loss of paint.

Figure 11:
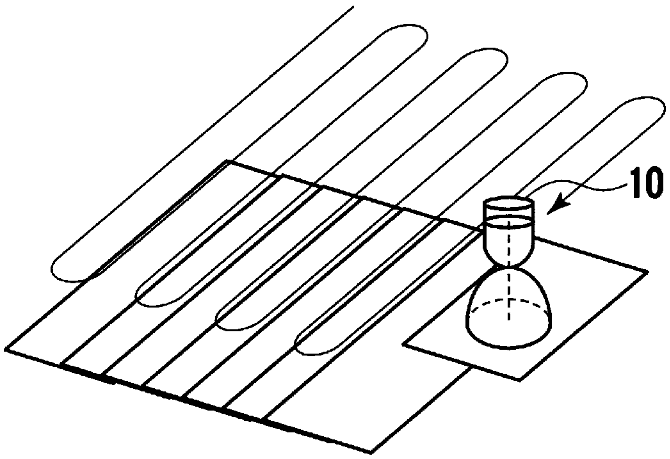
FIG. 11 is a schematic perspective view showing a state in which coating is performed with various spray patterns.
Figure 11:
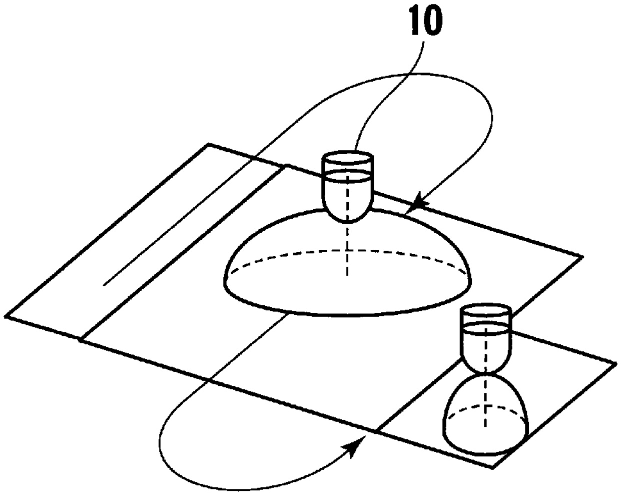

FIG. 11 is a schematic perspective view showing a state in which the rotary atomizer 10 performs coating with various spray patterns. FIG. 11(A) corresponds to FIG. 10(A). When the rotary atomizer 10 performs coating with a narrow spray pattern as shown in FIG. 11(A), overspray seldom occurs; however, the rotary atomizer 10 needs to be reciprocated multiple times for the coating. Meanwhile, FIG. 11(B) corresponds to FIG. 10(C). When the rotary atomizer 10 performs coating with two kinds of wide and narrow spray patterns as shown in FIG. 11(B), the occurrence of overspray can be prevented; moreover, the number of times the rotary atomizer 10 is required to be reciprocated for the coating is less than the case of FIG. 11(A).

In this embodiment, the controller 60 sets the particle size of paint particles to be sprayed on a first portion of the object to be coated at a predetermined value smaller than that for the particle size of paint particles to be sprayed on a second portion of the object to be coated. Here, the spray width for the first portion is larger than for the second portion. Specifically, with reference to the graph in FIG. 6, the controller 60 sets the particle size of the paint particles so that the IV in the first portion of the object to be coated may be the same as the IV in the second portion which is different from the first portion. At this time, the controller 60 controls the particle size of the paint particles and the spray pattern by adjusting the discharge rate of paint, the rotational speed of a bell cup, and the airflow rate of shaping air. By adjusting the coating condition in the above-described manner, the controller 60 can easily control the particle size and flying velocity of the paint particles.

When the coating apparatus 1 coats a surface of the object to be coated 25, such as a body of an automobile, with paint containing a glitter pigment by spraying the paint on the surface, the controller 60 adjusts the particle size and flying velocity of the paint particles in accordance with the coating condition thus set on the basis of the relation in which a smaller particle size of the paint particles brings higher metallic effect of a coating film on the surface of the object to be coated 25, and the relation in which a higher flying velocity of the paint particles in a direction perpendicular to the surface of the object to be coated 25 brings higher metallic effect of the coating film on the surface of the object to be coated 25. Thereby, the controller 60 controls the color shade of paint on the object to be coated 25.

Thus, this embodiment makes it possible to obtain the desired color shade with various spray patterns, and thereby to reduce the loss of paint. Further, this embodiment makes it possible to promptly determine a new coating condition for obtaining the desired color shade in employing a new paint color.

The embodiment described above is merely an example for facilitating the understanding of the present invention, and the present invention is not limited to this embodiment. Modifications and changes that belong to the technical scope of the present invention are all within the scope of the present invention.

For example, in the above-described embodiment, the particle size of paint particles to be sprayed on a first portion of the object to be coated is set at a predetermined value smaller than that for the particle size of paint particles to be sprayed on a second portion of the object to be coated, the spray width for the first portion being set larger than for the second portion. However, the present invention is not limited to this. The present invention may be applied to a configuration in which, when the metallic effect of the coating film at the first portion is set higher than at the second portion, the particle size of the paint particles to be sprayed on the first portion is adjusted so as to be smaller than a predetermined value for the case of allowing the first and second portions to have the same degree of metallic effect. The present invention may also be applied to a configuration in which, when the metallic effect of the coating film at the first portion is set lower than at the second portion, the particle size of the paint particles to be sprayed on the first portion is adjusted so as to be larger than the predetermined value. At this time, the controller 60 sets the particle size of the paint particles to be sprayed on the first portion at a second predetermined value which is smaller than the predetermined value or a third predetermined value which is larger than the predetermined value so that the first portion of the object to be coated and the second portion of the object to be coated may have different color shades of paint previously determined, for example. Such a configuration makes it possible to coat the object to be coated with paint while controlling the color shade of the paint as desired. For example, coating with elaborate design (such as gradation) is possible by changing the color shade for each portion of the object to be coated.

The present disclosure relates to subject matters contained in Japanese Patent Application No. 2008-220297, filed on Aug. 28, 2008, and Japanese Patent Application No. 2009-107961, filed on Apr. 27, 2009, the disclosures of all of which are expressly incorporated herein by reference in their entireties.

INDUSTRIAL APPLICABILITY

The present invention provides a coating method and a coating apparatus which are capable of controlling the color shade of paint on an object to be coated by adjusting the particle size of the paint particles according to the spray width. Thus, it is possible to obtain the desired color shade with various spray widths, and thereby to reduce the loss of paint. Further, a new coating condition for obtaining the desired color shade can be promptly determined in employing a new paint color. Accordingly, a coating method and a coating apparatus according to the present invention can be applied in the industrial field.

The invention claimed is:

1. A coating method of coating a surface of an object with a paint containing a glitter pigment, the coating method comprising:

spraying the paint onto the surface of the object utilizing a rotary atomizer;

controlling a color shade of the paint on the object by adjusting a particle size of paint particles to be sprayed; and setting the particle size of paint particles according to a spray width indicating a width of a spread of the paint particles, wherein the particle size of the paint particles to be sprayed on a first portion of the object is set to a value that is smaller than the particle size of the paint particles to be sprayed on a second portion of the object, the spray width for the first portion being set larger than that for the second portion.

2. The coating method according to claim 1, wherein when metallic effect of a coating film at the first portion of the object is set larger than at the second portion of the object, the particle size of the paint particles to be sprayed on the first portion is set to be smaller than a particle size for the first portion that would allow the first and second portions to have the same degree of metallic effect of the coating film, and when the metallic effect of a coating film at the first portion of the object is set smaller than at the second portion of the object, the particle size of the paint particles to be sprayed on the first portion is set to be larger than a particle size for the first portion that would allow the first and second portions to have the same degree of metallic effect of the coating film.

3. The coating method according to claim 1, wherein the rotary atomize comprises a bell cup, the particle size is adjusted by adjustment of a rotational speed of the bell cup of the rotary atomizer and a discharge rate of the paint, and the spray width is adjusted by adjustment of an airflow rate of shaping air to be blown from a rear side of the bell cup.

4. The coating method according to claim 3, wherein the shaping air includes:

first shaping air which is blown from the rear side of the bell cup toward the object; and second shaping air which is blown from the rear side of the bell cup toward the object in an outwardly extending direction at an angle from a traveling direction of the first shaping air.

5. The coating method according to claim 2, wherein the rotary atomizer comprises a bell cup, the particle size is adjusted by adjustment of a rotational speed of the bell cup of the rotary atomizer and a discharge rate of the paint, and the spray width is adjusted by adjustment of an airflow rate of shaping air to be blown from a rear side of the bell cup.

6. The coating method according to claim 5, wherein the shaping air includes:

first shaping air which is blown from the rear side of the bell cup toward the object; and second shaping air which is blown from the rear side of the bell cup toward the object in an outwardly extending direction at an angle from a traveling direction of the first shaping air.

* * * * *